United States Patent [19]

Kruszewski

[11] Patent Number: 5,201,896
[45] Date of Patent: Apr. 13, 1993

[54] UNIVERSAL AUDIO SPEAKER MOUNTING BRACKET

[76] Inventor: Kevin W. Kruszewski, 1981 Petrolia Dr., Union Lake, Mich. 48387

[21] Appl. No.: 717,977

[22] Filed: Jun. 20, 1991

[51] Int. Cl.⁵ ............................................. E04G 3/00
[52] U.S. Cl. .................................. 248/278; 248/282; 248/284
[58] Field of Search .............. 248/274, 278, 276, 279, 248/280.1, 282, 287, 289.1, 291, 179, 183, 130, 131, 415, 425, 284; 403/57, 53, 155

[56] References Cited

U.S. PATENT DOCUMENTS

| | | | |
|---|---|---|---|
| 1,395,847 | 11/1921 | Lorey | 248/278 |
| 1,476,758 | 12/1923 | LaHodny | 248/278 |
| 2,278,356 | 3/1942 | Livingston | 248/278 |
| 2,419,923 | 4/1947 | Tolbert | 248/226 |
| 3,781,047 | 12/1973 | Surko, Jr. | 403/53 X |
| 4,470,106 | 9/1984 | Norton | 362/398 |
| 4,654,670 | 3/1987 | Fleming | 248/183 X |
| 4,765,580 | 8/1988 | Wright | 248/181 |
| 4,887,784 | 12/1989 | Kayali | 248/311.2 |
| 4,928,914 | 5/1990 | Snodell | 248/323 X |
| 5,074,513 | 12/1991 | Presley et al. | 248/130 X |

OTHER PUBLICATIONS

Omni Mount Systems Brochure.
Triad OnWall Bracket Brochure.
Peerless Speaker Mounts Brochure.

Primary Examiner—Ramon O. Ramirez
Attorney, Agent, or Firm—Basile and Hanlon

[57] ABSTRACT

An article holder for mounting an audio speaker to a support surface includes a pair of connector members, each mounted on separate mounting plates and each pivotally connected to opposite ends of a link for repositionally supporting the speaker in three dimensions of adjustability. Each pivot connection is releasably lockable in a fixed position. In one embodiment, the article mounting plate is rotatably connected to one of the connectors for 360° rotation with respect to the associated connector. In another embodiment, the article mounting plate and the attached connector is selectively pivotal and lockable in one of a plurality of discrete angular positions with respect to the link.

19 Claims, 2 Drawing Sheets

UNIVERSAL AUDIO SPEAKER MOUNTING BRACKET

BACKGROUND OF THE INVENTION

1. Field of the Invention

The present invention relates, in general, to article supports and, specifically, to article supports having pivotal adjustment modes and, more specifically, to audio speaker supports.

2. Description of the Art

Various article supports for adjustably supporting diverse articles on walls, shelves, floors and other support surfaces have been previously devised. Such article supports have been designed with one or more pivotal links or members to enable the support to be rearranged to locate the attached article in any desired position for its intended use. Such supports also enable an article to be supported in its intended or desired orientation despite the orientation of the adjacent support surface to which it is to be mounted.

Supports have also been used with audio speakers to mount such speakers on a wall or ceiling of a room. Such audio support speakers find increasing use in business establishments, such as restaurants, movie theaters, etc., where the broadcast audio sounds must fill large areas, and in residential houses where surround sound is desired. Heretofore, such audio speaker supports have been provided with only limited degrees of movement, i.e., in one plane, either left and right or up and down, but not generally both planes of movement.

It is known to utilize a ball and socket for supporting an audio speaker in order to provide greater degrees of freedom of adjustment in positioning the audio speaker with respect to a vertical wall. However, certain of such ball and socket audio speaker supports have been integrally formed with and designed specifically for a particular manufacturer's speaker. That is, the ball or socket is formed as an integral part of the speaker housing. As such, any damage to the ball and socket support renders the support as well as the attached speaker inoperative insofar as mounting of the speaker is concerned. In other types of ball and socket audio speaker supports, a clevis forming a socket is mounted to the speaker or to a wall mounting plate. A threaded bolt extends through the arms of the clevis to enable a ball to be inserted into the clevis before the bolt is tightened to secure the support and attached speaker in place. However, these types of ball and socket supports are cumbersome to install such that installation of a speaker to a wall or ceiling via a ball and socket support most times requires two people.

Thus, it would be desirable to provide an article support particularly suited for mounting audio speakers to a support surface which overcomes the deficiencies associated with previously devised article supports and, particularly, audio speaker supports. It would also be desirable to provide a support which is usable with any type or style of audio speaker. It would also be desirable to provide an audio speaker support which is capable of variably positioning the speaker in any desired position in three dimensions. It would be desirable to provide an audio speaker support which is attachable to any support surface, despite the orientation of the support surface. Finally, it would be desirable to provide an audio speaker support which can be used by a single person to mount an audio speaker to a wall, ceiling or other support surface.

SUMMARY OF THE INVENTION

The present invention is a mounting bracket for repositionally mounting an article, such as an audio speaker, to a support surface.

The support mounting bracket of the present invention includes a first mounting plate removably attachable to a support surface. A link has first and second opposed ends. A first connector means is mounted on the first mounting plate for pivotally and releasably lockingly connecting the first end of the link to the first mounting plate for pivotal movement of the link about the first end in a first plane.

The support bracket also includes a second mounting plate which is attachable to an article, such as an audio speaker. A second connector means is mounted on the second mounting plate for pivotally connecting the second end of the link to the second mounting plate for pivotal movement of the second mounting plate and the attached article in a second plane substantially perpendicular to the first plane.

In a preferred embodiment, the first connector means includes first and second spaced arms which are mounted on and extend outward from the first mounting plate and receive the first end of the link therebetween. The second connector means includes first and second spaced arms which are interconnected by a central leg mounted on the second mounting plate, with the first and second arms extending outward from the second mounting plate and spaced apart a distance to respectively be disposed on opposite sides of the second end of the link.

First and second pivot means are provided in the first and second connector means, respectively, for pivotally connecting opposed ends of the link to the first and second connector means. First and second lock means are associated with each of the first and second connector means, respectively, for fixedly locking the first end of the link in a selected angular position with respect to the first mounting plate and, also, for fixedly locking the second connector means in a selected angular position with respect to the second end of the link.

Preferably, the first mounting plate and the first connector means, and the second connector plate and second connector means are each separately formed as one-piece integral members.

In one embodiment of the present invention, the mounting bracket includes means for rotatably connecting the second mounting plate to the second connector means for rotation of the second mounting plate in a third plane different from the first and second planes. Third means are also provided for locking the second mounting plate in a selected angular position with respect to the second connector mean. In this embodiment, the rotating means comprises a pin mounted on and extending outward from the second mounting plate. The pin rotatably engages a bore formed in the central leg of the second connector means. A set screw extends through the central leg of the second connector means and engages the pin to fix the pin and the attached second mounting plate in a desired angular position with respect to the second connector means.

In another embodiment, means are provided for variably positioning the second connector means with respect to the second end of the link in one of a plurality of selectible, discrete positions. In this embodiment, a plurality of circumferentially spaced bores are formed in the second end of the link and are radially spaced from the second pivot means. The first and second legs of the second connector means include aligned bores which are both alignable with one of the circumferentially-bores in the second end of the link. A fastener, such as a pin or a pointed hex screw, is insertable through the aligned bores in the first and second legs into one of the circumferentially spaced bores in the link to fix the second connector means in one of the angular spaced positions with respect to the second end of the link.

In yet another embodiment, the second mounting plate has a planar shape for attachment to the housing of an audio speaker. In this embodiment, it is preferred that the first mounting plate and the first connector means are integrally formed as a one-piece member. Likewise, the second connector means and the second mounting plate are integrally formed as a one-piece member.

The article mounting bracket of the present invention is ideally suited for use in repositionally mounting an audio speaker to a support surface, such as a wall, shelf, floor, ceiling, etc. The mounting bracket of the present invention is ideally suited for mounting substantially all types of audio speakers to a support surface without requiring any modification of the audio speaker. The mounting bracket enables the article, such as an audio speaker, to be repositioned in at least two dimensions and, in one embodiment, rotatable about an axis extending through the center of the second mounting plate which enables the article or speaker to be positioned as desired for a particular application. The mounting bracket also enables the speaker to be repositioned as needed.

The mounting bracket of the present invention is simple in construction and is made of inexpensive, easily formed components for a low manufacturing cost. More importantly, the present mounting bracket can be used by a single person to mount an audio speaker to a wall, ceiling or other support surface. This eliminates the need for two installers as is required by certain audio speaker mounting brackets, particularly those employing ball and sockets.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

The present invention is an article mounting bracket for mounting an article, such as an audio speaker, to a suitable support surface in which the article may be repositioned in multiple dimensions as needed for a particular application. Although the bracket described hereafter is defined and illustrated as mounting an audio speaker to a support surface, it will be understood that the bracket may be employed for mounting other articles in addition to the audio speaker application described hereafter.

Figure 1:
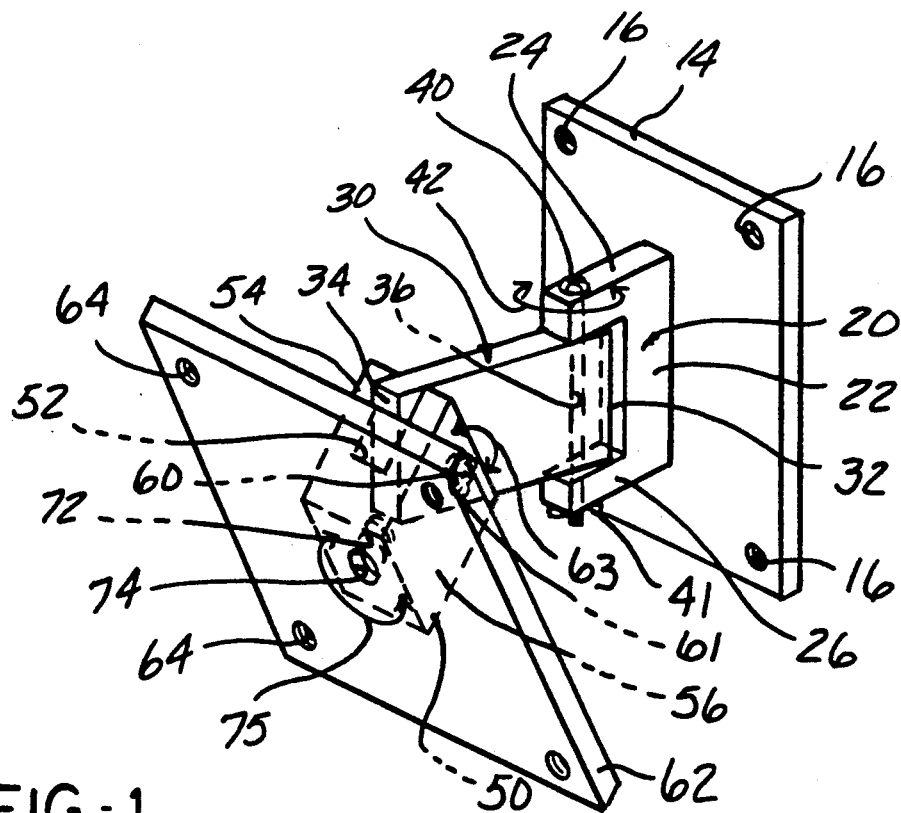
FIG. 1 is a perspective view of one embodiment of an audio speaker mounting bracket constructed in accordance with the teachings of the present invention.
Figure 2:
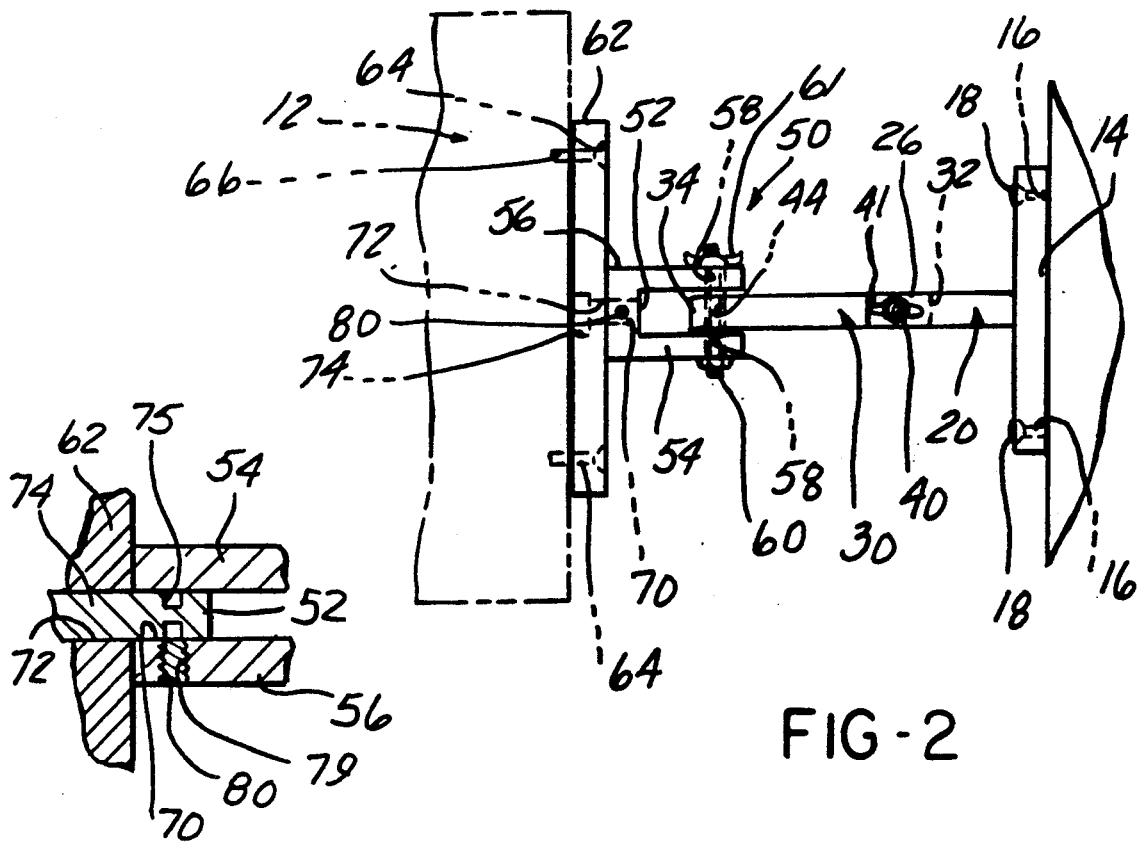
FIG. 2 is a bottom view of the bracket shown in FIG. 1.
Figure 3:
FIG. 3 is an enlarged, cross sectional view through the rotatable pin shown in FIG. 2.

Referring now to the drawing, and to FIGS. 1, 2 and 3 in particular, there is illustrated a first embodiment of a universal audio speaker mounting bracket which is denoted in general by reference number 10. The mounting bracket 10 includes a first mounting plate 14. In a preferred embodiment, the first mounting plate 14 has a generally planar shape and may be formed with a rectangular, square, circular, polygonal or other cross section. The first mounting plate 14 is removably attachable to a support surface, such as a wall 15, as shown in FIG. 2. The first mounting plate 14 may also be mounted to a shelf, ceiling, floor, etc. Further, the support surface 15 to which the first mounting plate 14 is attached, may have any orientation, such as horizontal, vertical, angular, etc.

As shown in FIGS. 1 and 2, the first mounting plate 14 includes a plurality, preferably four, of through bores 16 which are configured to receive suitable fastening means, such as screws 18, for removably attaching the first mounting plate 14 of the mounting bracket 10 to the support surface 15.

The mounting bracket 10 also includes a first connector means or member 20. The first connector means 20 has a generally U-shape formed of a central leg 22 which interconnects two spaced arms 24 and 26 which extend outward from the central leg 22. It will be understood that the two spaced arms 24 and 26 may be directly to one surface of the first mounting plate 14 without the need for the central leg 22.

The first connector means 20, formed of two spaced arms 24 and 26 or two spaced arms 24 and 26 interconnected by a central leg 22, may be formed of separate pieces which are secured together, such as by suitable fasteners, adhesives, sonic welding, etc. In addition, the first connector means 20 may be mounted by such fastening means to the first mounting plate 14. For light load applications, the first mounting plate 14 and the first connector means 20 may be integrally formed as a single piece unit or member from a molded plastic material.

A link 30 has a generally planar shape and, by way of example only, a rectangular cross section. The link 30 has first and second opposed ends 32 and 34, respectively. A first bore 36 is formed in the link 30 adjacent the first end 32 of the link 30 and extends completely through the link 30 between opposed side edges of the link 30 as shown in FIG. 1. A second bore 44 is also formed in the link 30 adjacent the second end 34 of the link 30, as shown in FIG. 2. The second bore 44 extends completely through the link 30 and is oriented transverse and substantially perpendicular to the first bore 36.

A pivot means or pin 40 extends through the first bore 36 in the link 30 and the aligned bores formed in the arms 24 and 26 of the first connector means 20 to pivotally interconnect the first end 32 of the link 30 to the first connector means 20. The pivot pin 40 preferably comprises a carriage bolt having a nut head, a smooth shaft and a threaded end. A first lock means, such as a threaded wing nut 41, is threadingly engageable with the threaded end of the bolt 40 extending outward from the arm 26 to clamp and pivotally lock the first end 32 of the link 30 in a selected angular position to the first connector means 20. The link 30 is thus pivotal about the pin 40 in a first plane of rotation as shown by the arrow 42 in FIG. 1. Other fasteners, such as a threaded bolt and nut may also be employed as the pivot pin 40.

The mounting bracket 10 also includes a second connector means denoted in general by reference number 50. The second connector means or member 50 also has a general U-shape formed of a central leg 52 which interconnects two outwardly extending, spaced arms 54 and 56. The arms 54 and 56 are spaced apart a distance substantially equal to the thickness of the link 30 so as to be disposed in close proximity or registry with opposed sides of the second end 34 of the link 30 as shown in FIGS. 1 and 2.

A second pivot pin 60 extends through aligned bores 58 formed in the legs 54 and 56 of the second connector means 50 and the second bore 44 in the second end 34 of the link 30. Preferably, the pivot pin 60 comprises a carriage bolt which receives a second lock means, such as a wing nut 61 on one end. The pin 60 enables the second connector member 50 to be pivotally attached to the second end 34 of the link 30, and at the same time, to be adjustably movable in a second plane, substantially perpendicular to the first plane defined by the first pivot 40 as shown by the arrow 63 in FIG. 1. The second connector member 50 is lockable in a selected angular position with respect to the second end 34 of the link 30 by tightening the wing nut 61, which brings the two arms 54 and 56 into secure, non-movable engagement with the second end 34 of the link 30.

A second mounting plate 62 is attached to the second connector means 50. Although the second mounting plate 62 may comprise a separate member, it is preferred that the second mounting plate 62 be integrally formed with the second connector member 50 as a one-piece member. A plurality of bores 64, preferably four in number, extend through the second mounting plate 62 and receive fasteners 66 for attaching the second mounting plate 62 to an article, such as an audio speaker 12.

The mounting bracket 10 uniquely includes means for rotatably connecting the second mounting plate 62 to the second connector member 50 to enable the second mounting plate 62 to be rotated 360° about an axis extending longitudinally through the second mounting plate 62 and the second connector member 50. Preferably, the rotating means comprises a pin 74 which is mounted in a bore 72 formed in the mounting plate 62 and extends outward therefrom. As shown in detail in FIG. 3, the external end of the pin 74 rotatably engages a bore 70 formed in the central leg 52 of the second connector member 50. Lock means 80 are provided for locking the pin 74 to the second connector member 50. The lock means 80 preferably comprises a set screw which extends through a traverse bore 79 formed in the central leg 52 of the second connector member 50 into engagement with an annular notch 75 formed in the external end of the pin 74 disposed in the bore 70 in the second connector member 50. In this manner, the mounting plate 62 may be rotated any angular amount about a longitudinal axis extending through the pin 74 with respect to the second connector member 50 and fixed in place.

The mounting bracket 10 described above with an attached speaker is easily mounted on any support surface by a single person. In a first step, the first mounting plate 14 having the first connector member 20 attached thereto is mounted as a unit to a support surface, such as a wall 15, by fasteners 18 which extend through the bores 16 in the first mounting plate 14 into the wall 15. The second mounting plate 62 having the second connector means 50 attached thereto is then connected to an article, such as an audio speaker 12, by fasteners 66 extending through the bores 64 in the second mounting plate 62 into the housing of the audio speaker 12.

Next, the link 30 may be attached to either of the first or second connector members 20 or 50. Assuming that the link 30 is first connected to the first connector member 20, the pivot pin 40 is inserted through the aligned bores in the first connector member 20 and the first end 32 of the link 30 and the wingnut 41 loosely tightened thereon to hold the link 30 in a loose, easily adjustable position. The audio speaker 12 having the second mounting plate 62 and the second connector member 50 attached thereto is then positioned with respect to the second end 34 of the link 30 and the pivot pin 60 inserted through the aligned bores in the second end 34 of the link 30 and the second connector member 50. The wingnut 61 is then tightened to securely and fixedly position the speaker 12, the second mounting plate 62 and the second connector member 50 in the desired angular position with respect to the link 30. The speaker 12 and the link 30 are then angularly moved about the first end 32 of the link 30 to the desired position before the wingnut 41 is tightened to fix the speaker 12 in its final desired position.

All of the components of the mounting bracket 10 are preferably formed of a metallic material, such as aluminum, steel, etc. The individual components may be machined or formed separately and then interconnected by fasteners, adhesives, etc. Other materials, such as plastic, wood, etc., may also be employed to form some or all of the individual components of the mounting bracket 10. If a plastic is employed, it is preferred that the first mounting plate 14 and the first connector 20 be integrally formed as a one-piece member from a moldable plastic. Likewise, it is preferred that the second mounting plate 62 and the second connector member 50 also be integrally formed as a one-piece member from a moldable plastic.

Figure 4:
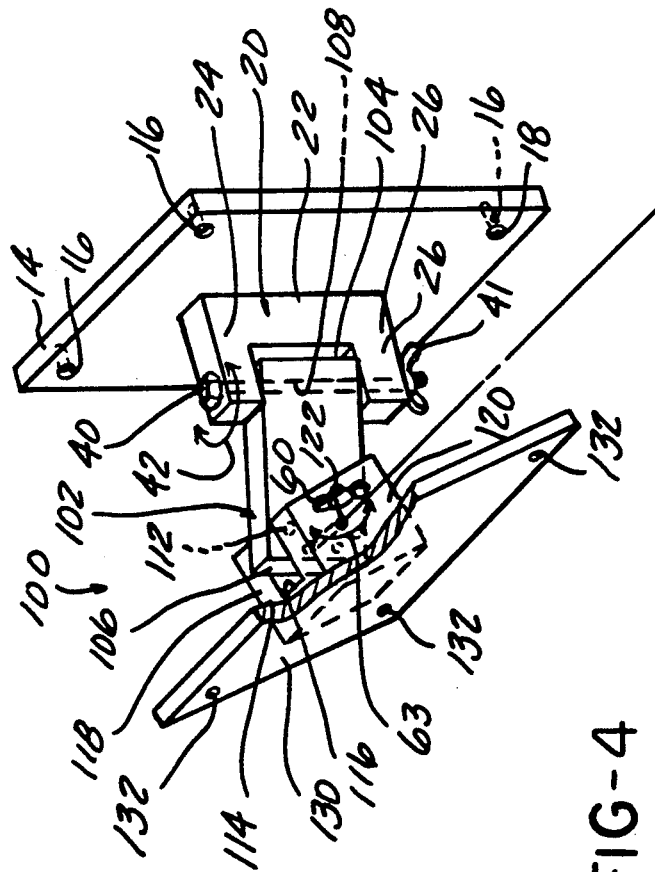
FIG. 4 is a perspective view of another embodiment of the audio speaker mounting bracket of the present invention.
Figure 5:
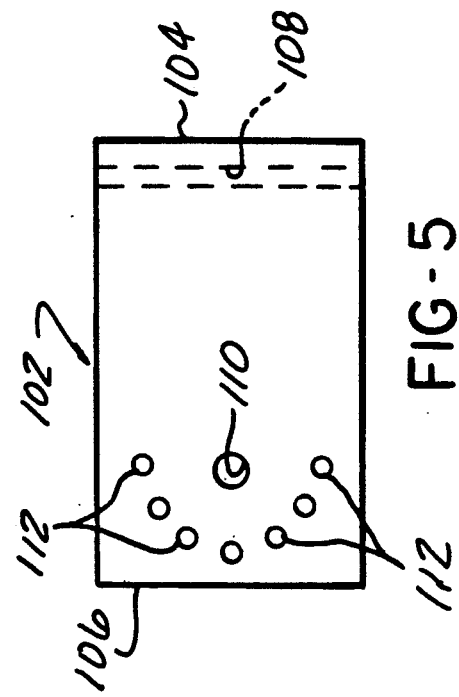
FIG. 5 is a front elevational view of the link shown in the mounting bracket depicted in FIG. 4.

Referring now to FIGS. 4 and 5, a second embodiment of the present mounting bracket will be described. Identical reference numbers are used to refer to components which are the same in this embodiment and the prior embodiment described about and shown in FIGS. 1, 2 and 3.

The mounting bracket 100 includes a first mounting plate 14 and a first connector means 20, the first connector means includes at least first and second spaced arms 24 and 26, respectively.

A link 102 is provided in the mounting bracket 100 and is substantially the same as the link 30 described above and shown in FIG. 1. The link 102 has a first end 104 and an opposed second end 106. A bore 108 is formed through the first end 104 of the link 102 to receive the pivot pin 40 so as to pivotally connect and adjustably lock the link 102 to the first connector member 20 as described above in detail.

A second bore 110, as shown in FIG. 5, is formed adjacent the second end 106 of the link 104 and receives the second pivot fastener 60 which is employed to attach a second connector member, described hereafter, to the second end 106 of the link 102. The bore 110 is substantially perpendicular to the bore 108 and defines a second axis of rotation, as shown by arrow 63 different from the axis of rotation shown by the arrow 42 at the first end of the link 102.

As shown in FIG. 5, a plurality of circumferentially spaced bores 112 are formed in the link 102 adjacent the second end 106 of the link 102. The bores 112 are equi-radially spaced from the bore 110 in the link 102.

A second connector member 114 substantially identical to the second connector member 50 described above and shown in FIG. 1 is adjustably pivotally connected to the second end 106 of the link 102 via the pivot pin 60 The second connector member 114 includes a central leg 116 which interconnects two outwardly extending, spaced, opposed arms 118 and 120. The legs 118 and 120 are disposed on opposite sides of the second end 106 of the link 102 as described above. It should be noted that the central leg 116 is not necessarily needed in this embodiment of the mounting bracket 100 as the arms 118 and 120 may be directly mounted on the second mounting plate 130.

A third bore 122, FIG. 4, is formed in at least one and preferably both of the arms 118 and 120 of the second connector members 114. A fastener, such as a pin 124, is insertable through the aligned bores 122 and 112 to adjustably position the second connector member 114 in any one of the discrete angular positions defined by the bores 112 in the link 102. Optionally, a pointed threaded shaft having a hex head may be used in place of the pin 124, with the pointed end engaging one of the bores 112 in the link 102.

Finally, the mounting bracket includes a second mounting plate 130 having a plurality of spaced apertures 132 extending therethrough for receiving suitable fasteners for attaching an article, preferably an audio speaker, to the second mounting plate 130.

It will be understood that the discrete variable position means described above and shown in FIGS. 4 and 5 may be employed by itself or in combination with the rotatable means described above and shown in FIGS. 1 and 2.

The mounting bracket 110 is used and installed in the same manner as that described above for the first embodiment shown in FIGS. 1 and 2. However, after both of the first and second connector members 20 and 120, respectively, have been loosely attached to the link 102 via the pivot pins 40 and 60 and associated wingnuts, the angular position of the audio speaker, the second mounting plate 130 and the second connector member 114 may be adjusted by pivoting the second connector member 114 about the pivot fastener 60 and inserting the pin 124 through aligned ones of the bores 122 in the arms of the second connector member 120 in the bores 112 in the link 102 to fix the components in the desired angular position about the axis of the pivot pin 60.

Figure 6:
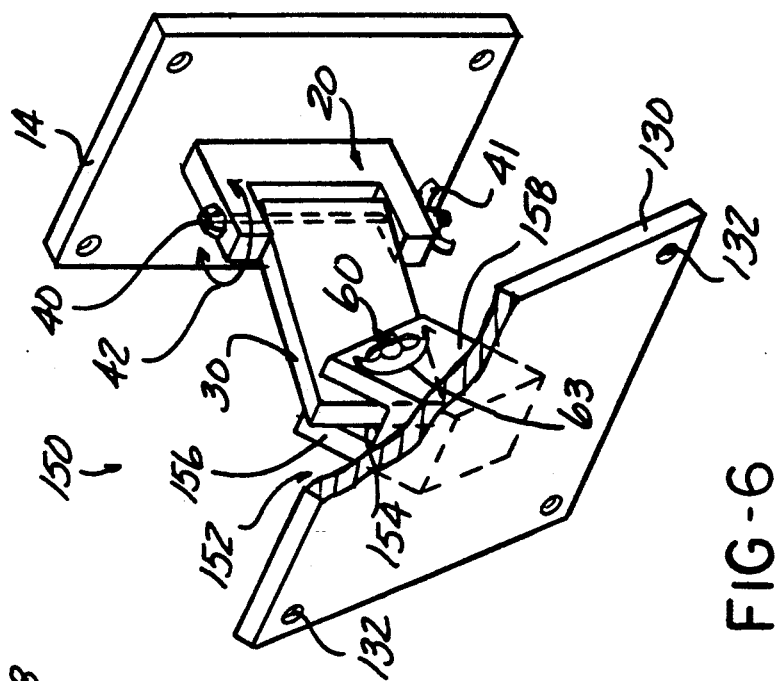
FIG. 6 is a perspective view of yet another embodiment of the audio speaker mounting bracket of the present invention.

A third embodiment of the mounting bracket of the present invention is shown in FIG. 6 and is denoted in general by reference number 150. This embodiment is a simplified version of the mounting bracket of the present invention and does not include the rotating means described above and shown in FIG. 1 or the variable discrete angular positioning shown in FIG. 4.

The mounting bracket 150 includes a first mounting plate 14, a first connector means 20, and a first link 30 which is pivotally connected at a first end to the first connector member 20 via a pivot fastener 40.

A second connector means 152 is pivotally connected to the second end of the link 30 via a second pivot pin 60 in the same manner as described above in the embodiments shown in FIGS. 1-5. A second mounting plate 130 is attached to the second connector means 152. The spaced legs 156 and 158 of the second connector member 152 may be interconnected at one end via a central leg 154 or directly connected to the second mounting plate 130.

The mounting bracket 150 shown in FIG. 6 provides two axes of adjustment of the article, such as an audio speaker, attached to the second mounting plate 130. These planes of adjustment are shown by the arrows 42 and 63 adjacent the pivot pins 40 and 60, respectively.

In summary, there has been disclosed a unique article mounting bracket which is particularly suited for mounting an audio speaker in a desired angular position in three dimensions to a support surface, such as a wall, ceiling, floor, shelf, etc. The mounting bracket is formed of easily constructed components for a low manufacturing cost. Further, the bracket may be assembled by a single person thereby making installation of the bracket and the article attached thereto to a support surface extremely easy. The mounting bracket of the present invention may be constructed in several different variations to provide varying degrees and axes of adjustability to suit the needs of many diverse applications.

What is claimed is:

1. An audio speaker bracket for adjustably mounting an audio speaker to a support surface comprising:
    a first mounting plate removably attachable to a support surface;
    a link having first and second opposed ends;
    first connector means, mounted on the first mounting plate, for pivotally and releasably lockingly connecting the first end of the link to the first mounting plate for pivotal movement of the link about a first axis extending through the first connector means;
    a second mounting plate attachable to an the audio speaker;
    second connector means, mounted on the second mounting plate, for pivotally and releasably lockingly connecting the second end of the link to the second mounting plate for pivotal movement of the second mounting plate and the audio speaker attached thereto about a second axis extending through the second connector means substantially perpendicular to the first axis;
    means for rotatably connecting the second mounting plate to the second connector means for rotation of the second mounting plate about a third, distinct axis substantially perpendicular to the first and second axes; and
    rotation locking means for locking the second mounting plate in a fixed position with respect to the second connector means.

2. The bracket of claim 1 wherein the first connector means comprises:
    first and second spaced arms mounted on and extending outward from the first mounting plate.

3. The bracket of claim 2 further comprising:

first lock means for locking the first end of the link to the first and second spaced arms in a selectible, fixed, angular position.

4. The bracket of claim 3 wherein the first lock means comprises:
a first releasably clampable fastener extending through the first and second arms and the first end of the link.

5. The bracket of claim 1 wherein the second connector means comprises:
first and second spaced arms interconnected by a central leg mounted on the second mounting plate, the first and second arms extending outward from the second mounting plate and spaced apart a distance to be respectively be disposed on opposite sides of the second end of the link.

6. The bracket of claim 5 further comprising:
second lock means for locking the first and second spaced arms of the second connector means to the second end of the link in a selectible, fixed, angular position.

7. The bracket of claim 6 wherein the second lock means comprises:
a second releasably clampable fastener extending through the first and second arms of the second connector means and the second end of the link.

8. The bracket of claim 5 wherein the rotatably connecting means comprises:
a pin mounted on the second mounting plate and having a portion extending outward therefrom;
the pin rotatably disposed in a bore formed in the central leg of the second connector means, the rotating locking means extending through the central leg of the second connector means into engagement with the pine to fix the pine and the second mounting plate attached thereto in a fixed position with respect to the second connector means.

9. The bracket of claim 8 wherein the rotating locking means comprises:
a further extensibly mounted in the central leg of the second connector means and releasably engaging the pin disposed in the bore of the central leg.

10. The bracket of claim 1 wherein:
the first mounting plate and the first connector means are integrally formed as a one-piece member from a molded plastic; and
the second mounting plate and the second connector means are integrally formed as a one-piece member from a molded plastic.

11. The bracket of claim 1 further comprising:
means for variably positioning the second connector means with respect to the second end of the link in one of a plurality of individually selectible, discrete, angular positions.

12. The bracket of claim 11 wherein the variably positioning means comprises:
the second connector means having first and second spaced arms mounted on and extending outward from the second mounting plate;
means for pivotally connecting the first and second arms of the second connector means to the second end of the link for pivotal movement of the second connector means with respect to the second axis through the second end of the link substantially perpendicular to the first axis;
a second bore extending through at least one of the first and second arms;

a plurality of circumferentially spaced bores formed in the second end of the link, one of the circumferentially spaced bores being selectively alignable with the second bore in the one of the first and second legs; and
fastener means extendible through the aligned one of the circumferentially spaced bores and the second bore to fix the second connector means in a discrete, angular position with respect to the second end of the link.

13. An audio speaker bracket for adjustably mounting an audio speaker to a stationary support member comprising:
a first mounting plate removably attachable to a support member;
a link having first and second opposed ends, a first bore extending in a first direction through the first end of the link, a second bore formed in the second end of the link and extending in a second direction substantially perpendicular to the first bore;
a first connector member having first and second spaced arms mounted on and extending outward from the first mounting plate, aligned bore formed in each of the first and second arms and alignable with the first bore in the first end of the link;
first fastener means extending through the aligned bores in the first and second legs of the first connector member and the first bore in the first end of the link for pivotally and lockingly connecting the first end of the link to the first connector member in a selectively angularly adjustable position;
a second mounting plate attachable to the audio speaker;
a second connector member having first and second spaced arms interconnected at one end by a central leg mountable on the second mounting plate, the first and second arms being spaced apart and extending outward from the central leg and disposed on opposite sides of the second end of the link, aligned bores formed in the first and second arms of the second connector member and alignable with the second bore in the second end of the link;
second fastener means engageable with the aligned bores in the first and second arms of the second connector member and the second bore in the second end of the link for pivotally and lockingly connecting the second connector member to the second end of the link in a selectively angularly adjustable position;
a pin mounted on and extending outward from the second mounting plate, the pin rotatably engaging a bore formed in the central leg of the second connector member for rotatably connecting the second mounting plate to the second connector member for 360° rotation about an axis extending through the pin; and
a set screw extending through the central leg into engagement with the pin disposed in the bore in the second connector member for fixedly connecting the pin and the second mounting plate attached thereto to the second connector member.

14. A bracket for adjustably mounting an article to a support surface comprising:
a first mounting plate removably attachable to a support surface;
a link having first and second opposed ends;
first connector means, mounted on the first mounting plate, for pivotally and releasably lockingly connecting the first end of the link to the first mounting plate for pivotal movement of the link about a first axis extending through the first connector means;

a second mounting plate attachable to an article;

second connector means, mounted on the second mounting plate, for pivotally and releasably lockingly connecting the second end of the link to the second mounting plate for pivotal movement of the second mounting plate and the article attached thereto about a second axis extending through the second connector means substantially perpendicular to the first axis; and means for variably and fixedly positioning the second connector means with respect to the second end of the link in one of a plurality of individually selectable, discrete, angular positions.

15. A bracket for adjustably mounting an article to a support surface comprising:

a first mounting plate removably attachable to a support surface;

a link having first and second opposed ends;

first connector means, mounted on the first mounting plate, for pivotally and releasably lockingly connecting the first end of the link to the first mounting plate for pivotal movement of the link about a link axis extending through the first connector means;

a second mounting plate attachable to an article;

second connector means, mounted on the second mounting plate, for pivotally and releasably lockingly connecting the second end of the link to the second mounting plate for pivotal movement of the second mounting plate and the article attached thereto about a second axis extending through the second connector means substantially perpendicular to the first axis; and means for variably and fixedly positioning the second connector means with respect to the second end of the link in one of a plurality of selectable, discrete, angular positions, the variably and fixedly positioning means including:

the second connector means having first and second spaced arms mounted on and extending outward from the second mounting plate;

means for pivotally connecting the first and second arms of the second connector means to the second end of the link for pivotal movement of the second connector means with respect to the second end of the link about the second axis substantially perpendicular to the first axis;

a second bore extending through at least one of the first and second arms;

a plurality of circumferentially spaced bores formed in the second end of the link, one of the circumferentially spaced bores being selectively alignable with the second bore in the one of the first and second arms; and fastener means extendible through the aligned one of the circumferentially spaced bores and the second bore to fix the second connector means in a discrete, angular position with respect to the second end of the link.

16. The bracket of claim 5 wherein the first connector means comprises:

first and second spaced arms mounted on and extending outward from the first mounting plate.

17. The bracket of claim 16 further comprising:

a first releasably clampable fastener extending through the first and second arms and the first end of the link for locking the first end of the link to the first and second arms in a selectively fixed, angular position.

18. The bracket of claim 15 wherein the fastener means comprises:

a second releasably clampable fastener extending through the first and second arms of the second connector means and the second end of the link.

19. A bracket for adjustably mounting an article to a support surface comprising:

a first mounting plate removably attachable to a support surface;

a link having first and second opposed ends;

first connector means, mounted on the first mounting plate, for pivotally and releasably lockingly connecting the first end of the link to the first mounting plate for pivotal movement of the link about a first axis extending through the first connector, the first connector means including first and second spaced arms mounted on and extending outward from the first mounting plate, a first releasably clampable fastener extending through the first and second arms and the first end of the link;

a second mounting plate attachable to an article;

second connector means, mounted on the second mounting plate, for pivotally and releasably lockingly connecting the second end of the link to the second mounting plate for pivotal movement of the second mounting plate and the article attached thereto about a second axis extending through the second connector means substantially perpendicular to the first axis, the second connector means including a second releasably clampable fastener extending through the first and second arms of the second connector means and the second end of the link;

the second connector means having first and second spaced arms mounted on and extending outward from the second mounting plate;

means for pivotally connecting the first and second arms of the second connector means to the second end of the link for pivotal movement of the second connector means with respect to the second end of the link about the second axis substantially perpendicular to the first axis; and means for variably and fixedly positioning the second connector means with respect to the second end of the link in one of a plurality of selectable, discrete, angular positions, the variably positioning means including:

a second bore extending through at least one of the first and second arms;

a plurality of circumferentially spaced bores forming in the second end of the link, one of the circumferentially spaced bores being selectively alignable with the second bore in the one of the first and second legs; and fastener means extendible through the aligned one of the circumferentially spaced bores and the second bore to fix the second connector means in a discrete, angular position with respect to the second end of the link.

* * * * *